United States Patent [19]

Green

[11] 4,435,246

[45] Mar. 6, 1984

[54] LABEL DISPENSING AND APPLYING APPARATUS

[75] Inventor: Ronald J. Green, Baraboo, Wis.

[73] Assignee: Franchise Mailing Systems, Milwaukee, Wis.

[21] Appl. No.: 432,646

[22] Filed: Oct. 4, 1982

[51] Int. Cl.$^3$ .............................................. B32B 1/00

[52] U.S. Cl. .................................... 156/542; 156/363; 156/566; 156/584

[58] Field of Search ............................... 156/541-542, 156/584, 361-363, 566

[56] References Cited

U.S. PATENT DOCUMENTS

| | | | |
|---|---|---|---|
| 3,915,785 | 10/1975 | Müller | 156/566 X |
| 3,985,603 | 10/1976 | Berner | 156/247 X |
| 4,046,613 | 9/1977 | Kucheck et al. | 156/542 X |
| 4,124,429 | 11/1978 | Crankshaw | 156/542 X |
| 4,314,869 | 2/1982 | Crankshaw | 156/361 X |
| 4,321,103 | 3/1982 | Lindstrom | 156/363 X |
| 4,324,608 | 4/1982 | Klinger | 156/542 X |

*Primary Examiner*—David A. Simmons
*Attorney, Agent, or Firm*—Ronald E. Barry

[57] ABSTRACT

An apparatus for stripping pressure-sensitive labels from a backing sheet including a label stripping assembly for initially stripping a portion of the labels from the backing sheet, a conveyor for transporting parcels in sequence past the stripping assembly, an elastic belt conveyor for stripping the labels from the backing sheet and transporting the labels to the parcels in timed sequence to the movement of the parcels on the conveyor, and a pair of pivotal roller assemblies for moving a portion of the elastic belt conveyor past the labels on the backing sheet to strip labels from the backing sheet.

16 Claims, 11 Drawing Figures

LABEL DISPENSING AND APPLYING APPARATUS

BACKGROUND OF THE INVENTION

This invention relates in general to label dispensing and applying machines and more particularly to a machine for removing pressure sensitive type labels from a backing sheet and the application of those labels to parcels such as mail or packages. Various automatic label dispensing machines are available for removing pressure sensitive labels from a backing strip, however, these machines, for the most part, merely strip the label from the backing strip so that the label is disposed in a position for manual application to a parcel. There are also machines available for automatically removing one label at a time from a backing strip such as disclosed in U.S. patent Ser. No. 3,983,603 issued Oct. 12, 1976 to George A. Berner and entitled "Method and Apparatus for Transportation of a Label". In this type of a machine, a single label is removed from the backing sheet and transported to a chute where the label is picked up by pressing a package against the pressure sensitive side of the label.

SUMMARY OF THE INVENTION

The label dispensing and applicating machine of the present invention automatically strips a row of pressure sensitive labels from a backing sheet and carries the labels transversely to the direction of motion of the backing sheet to a position where the label is automatically applied to a parcel. The machine is sequenced in timed relation to the flow of parcels carried on a parcel conveyor assembly so that the labels are automatically applied to each parcel as the parcel moves through the parcel conveyor. The machine is used to strip a plurality of labels simultaneously from the backing sheet in a continuous, instantaneous movement and transports those labels to the parcels at a speed much higher than previously available.

IN THE DRAWINGS

DESCRIPTION OF THE INVENTION

Figure 2:
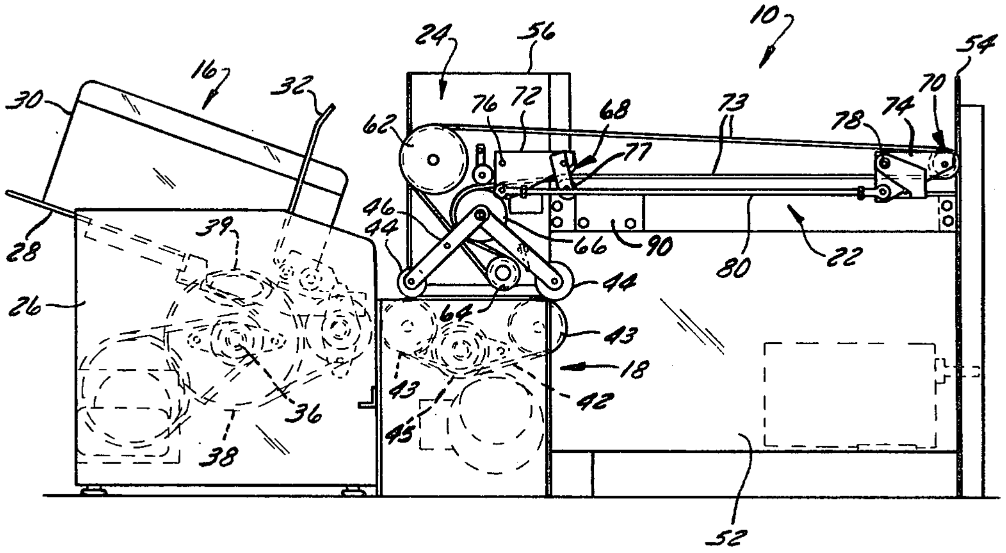
FIG. 2 is a side view in elevation showing the parcel conveyor assembly and the label conveyor assembly of the present invention.
Figure 1:
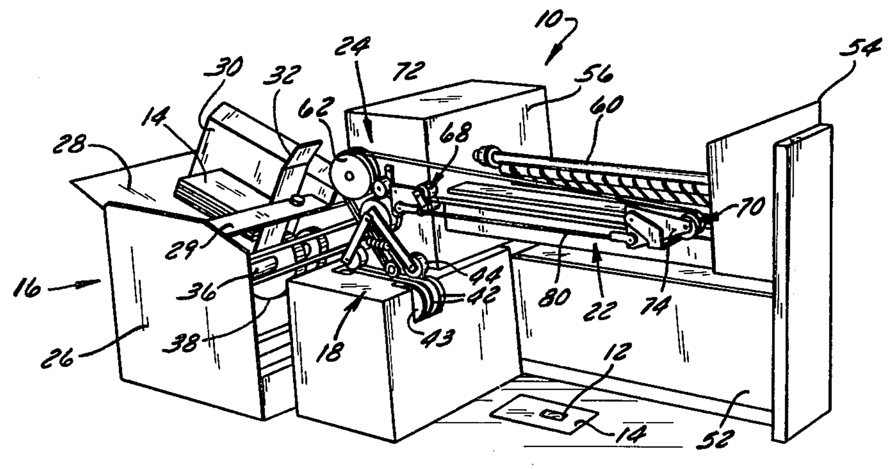
FIG. 1 is a perspective view of the label dispensing and applying machine of the present invention.

The label dispensing and applying machine 10, according to the present invention, is intended to be used for simultaneously stripping a row of pressure sensitive labels 12 from a backing sheet 20 and applying those labels to parcels 14 in the form of letters or packages. The parcels 14 are stacked in a loading station 16 and fed one at a time to a parcel conveyor assembly 18. The labels 12 are conventionally carried in rows on a backing sheet 20 which is fed through a label stripping assembly 22 where each row of labels is partially stripped from the backing sheet. A label conveyor assembly 24 is used to strip the labels off of the backing sheet and to apply the labels to the parcels as the parcels are dispensed from the reservoir 16 to the parcel conveyor assembly 18. The label stripping assembly 22 and the label conveyor assembly 24 are advanced in timed sequence to the movement of a parcel 14 on the parcel conveyor assembly 18.

The parcel loading station 16 is of conventional configuration and is designed to feed a single parcel at a time to the parcel conveyor assembly 18. The loading station 16 includes a pair of sidewalls 26 which support an inclined plate 28 and a support bar 29. A guide plate 30 is mounted on the inclined plate 28 and a stop plate 32 is mounted on the support bar 29. The lower end of the stop plate 32 is located at a spaced distance from the end of the inclined plate 28. The stop plate is spaced a distance from the plate 28 sufficient to allow a single parcel to be moved from the plate 28 at one time. A feed pulley 38 mounted on a shaft 36 is positioned in the space between the end of the inclined plate 28 and the stop plate 32 to pull the bottom parcel from the stack of parcels on the plate 28.

In this regard, parcels are stacked on the inclined plate 28 and aligned with the guide plate 30 with the front end of the stack of parcels engaging the stop plate 32. The parcels are fed to the conveyor assembly 18 by means of a feed pad 39 is provided on the outer surface of the pulley 38. The feed pad 39 is located beneath the end of the parcel 14 in a position to frictionally engage the bottom of the parcel. The stop plate 32 is elevated to a height sufficient to allow one parcel to be fed to the conveyor assembly 18 at one time.

The parcel conveyor assembly 18 includes a belt 42 mounted on a pair of pulleys 43 and being driven by a pulley 45. Means in a form of a pair of idler rollers 44 are used to hold the parcels on the belt conveyor 42. The idler rollers 44 are mounted on rocker arms 46 which are pivotally mounted on a fixed pivot pin 48. The rocker arms are biased by means of a spring 50 to hold the idler rollers 44 in contact with the belt 42.

Figure 3:
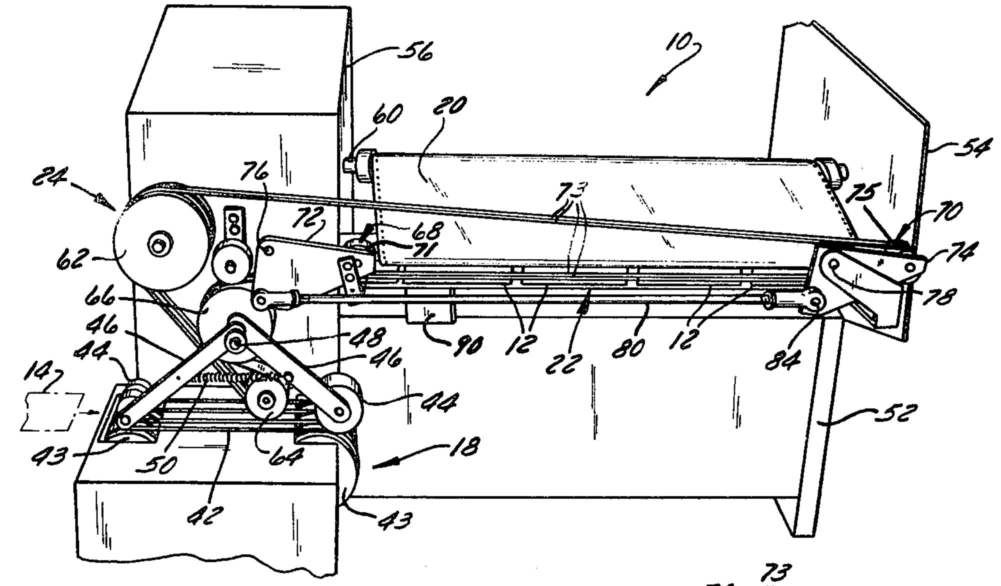
FIG. 3 is a partial perspective view of the label conveyor assembly and parcel conveyor assembly with a label positioned to be applied to a parcel.
Figure 5:
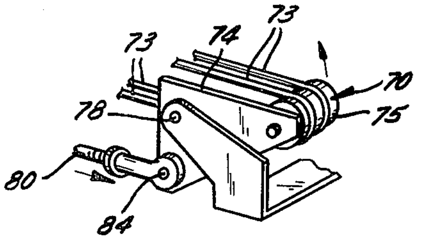
FIG. 5 is a perspective view of a portion of the rocker mechanism for the label conveyor assembly.
Figure 4:
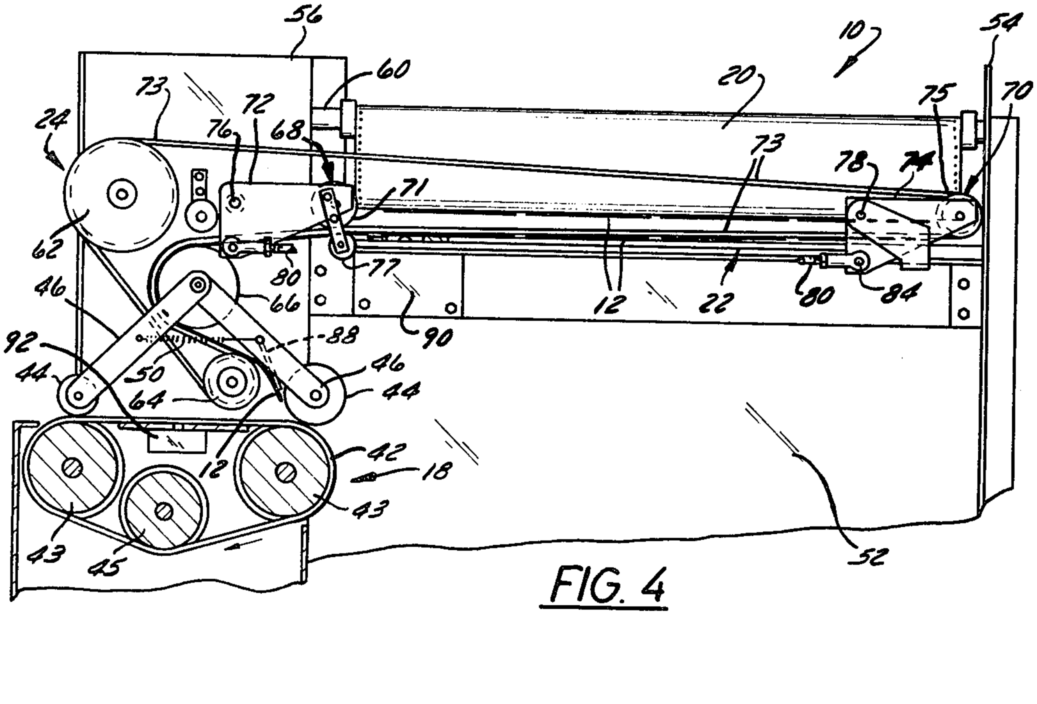
FIG. 4 is a front elevation view, partly in section, showing the label stripper assembly and the label conveyor assembly.
Figure 6:
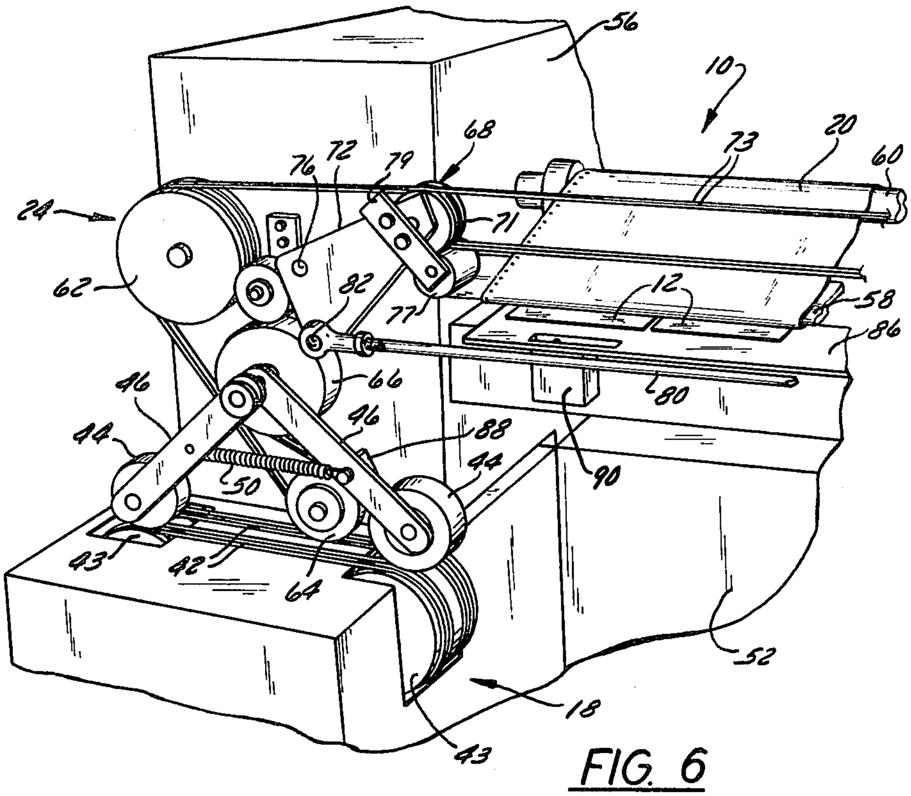
FIG. 6 is an enlarged perspective view of a portion of the label conveyor assembly and parcel conveyor assembly.

The label stripping assembly 22 as seen in FIGS. 3, 4 and 6 includes a base 52, having a side plate 54 on one side, and a motor drive housing 56 on the other side of the base 52. Labels are partially stripped from the backing sheet 20 by means of a label stripping plate 58 provided between the side plates 54 and the housing 56. The backing sheet 20 is brought in from a supply source (Not shown) underneath the stripping plate 58 and pulled back over the top of the stripping plate 58. The backing sheet is supported above the plate 58 by means of an idler shaft 60. Labels are partially stripped from the backing sheet by advancing the sheet in a step-by-step manner to pull the backing sheet around the edge of the stripping plate 58. The labels which are adhered to the outer surface of the backing sheet have an inherent stiffness sufficient to pull the label from the backing sheet as the backing sheet is pulled back over the edge of the plate 58. It should be noted that the pressure sensitive adhesive surface of the label will be located on the top of the label as seen in FIG. 6. A label dispensing machine, which operates in substantially a similar manner, is shown in U.S. Pat. No. 3,941,278, issued on Mar. 2, 1976, and entitled Label Dispensing Machine. The basic difference is that the labels are stripped with the adhesive on the bottom of the label in U.S. Pat. No. 3,941,278 rather than on the top of the label as required for the present invention.

The labels are removed from the backing sheet by means of the label conveyor assembly 24. In this regard, and referring to FIGS. 6 and 7, the label conveyor assembly 24 includes an idler roller 62, a stripping wheel 64, a label retainer wheel 66, and a pair of pivotally mounted roller assemblies 68 and 70. The labels are transported from the stripping assembly 22 to the parcel conveyor assembly 18 by means of one or more endless elastic conveyor bands 73. The bands 73 are mounted on the idler roller 62, stripping wheel 64, label retaining wheel 66 and roller assemblies 68 and 70. The roller assemblies 68 and 70 are used to move a portion of the conveyor bands 73 up and down in the path of the exposed labels 12 to strip the labels from the backing sheet 20.

Figure 7:
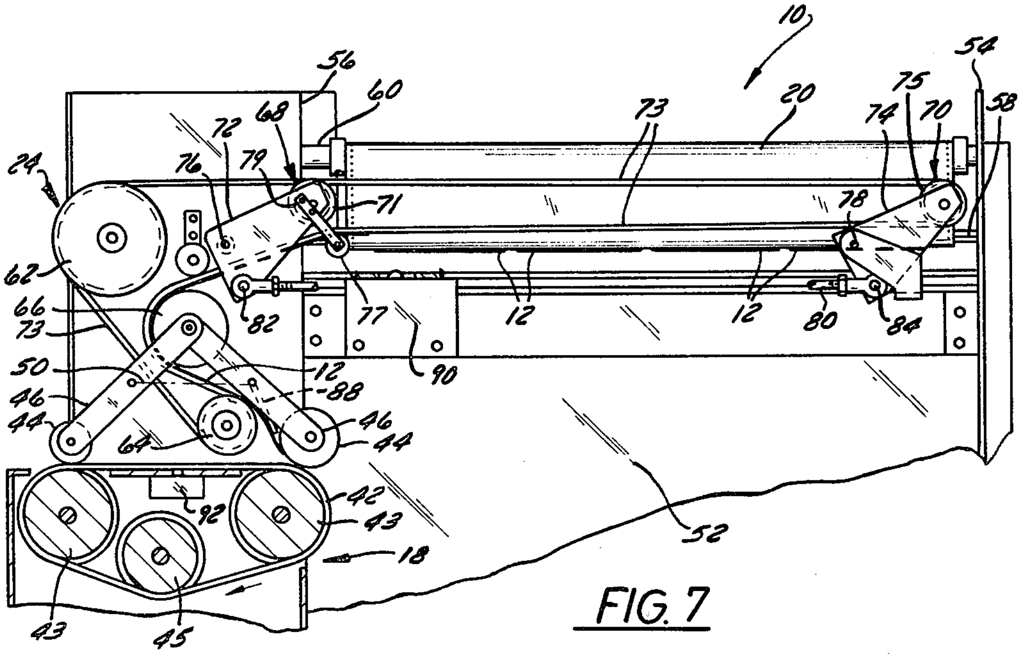
FIG. 7 is a front view similar to FIG. 4 showing the label conveyor assembly in the elevated position with respect to the labels to be stripped from the backing sheet.

In this regard, the roller assemblies 68 and 70 include a pair of rocker plates 72 and 74 respectively which are pivotally mounted on pins 76 and 78. Rollers 71 and 75 are mounted for pivotal movement on the plates 72 and 74. Means are provided for simultaneously pivoting the two rocker plates 72 and 74 on pins 76 and 78. Such means is the form of a connecting rod 80 which is connected to the plates 72 and 74 by means of screws 82 and 84. Pivotal motion of either of the plates 72 or 74 will produce an identical motion in the opposite plate. Means in the form of an idler roll 77 mounted a support bar 79 is provided on assembly 68 to raise the bands 73 in a generally parallel relation to the labels 12 as seen in FIG. 7.

Figure 9:
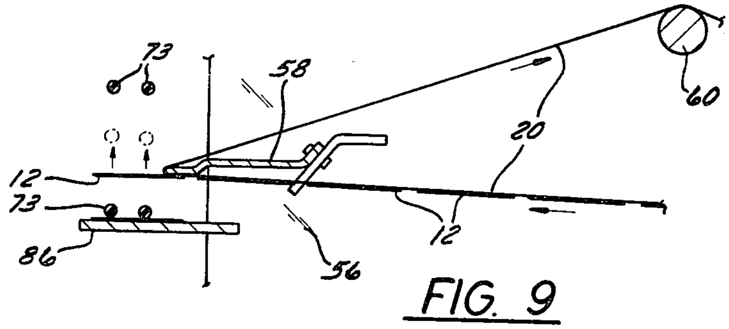
FIG. 9 is a cross sectional view of the stripping plate showing a label partially stripped from the backing sheet with the label conveyor assembly in the label transport position.
Figure 10:
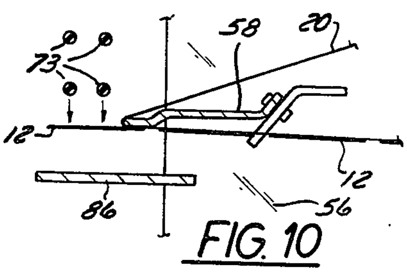
FIG. 10 is a view similar to FIG. 9 showing a portion of the label conveyor assembly in the elevated position.
Figure 11:
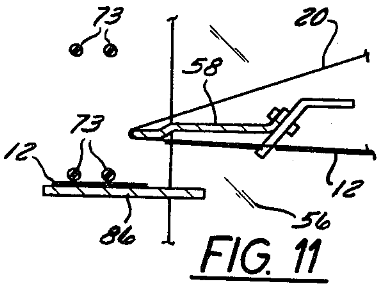
FIG. 11 is a view similar to FIG. 9 showing the portion of the label conveyor assembly returned to the label transport position.

In operation, the portion of the elastic bands 73 between the roller assemblies 68 and 70 is normally in the position shown in FIGS. 4 and 9. The backing sheet 20 as seen in FIGS. 4 and 9 is shown with the labels 12 partially stripped from the backing sheet and the adhesive surfaces exposed on the upper surface of the label. The portion of the bands 73 between the assemblies 68 and 70 are moved to the position shown in FIGS. 7 and 10 by rotating the roller assemblies 68 and 70 counterclockwise. The bands will move above the labels 12 engaging the non-adhesive side of the label. After the bands pass the labels they are moved downward to the original position engaging the adhesive surface of the labels 12 to strip the labels from the backing sheet. The labels will adhere to the bands and come to rest on the plate 86 located beneath the stripping plate, as seen in FIG. 11. As soon as the roller assemblies 68 and 70 are returned to their original position, the backing sheet 20 is indexed one step to strip the next row of labels from the backing sheet. The cycle of motion of the bands 73 to pick up a row of labels must be completed in the time frame between the movement of one label into engagement with a parcel and the next label with the next parcel.

Figure 8:
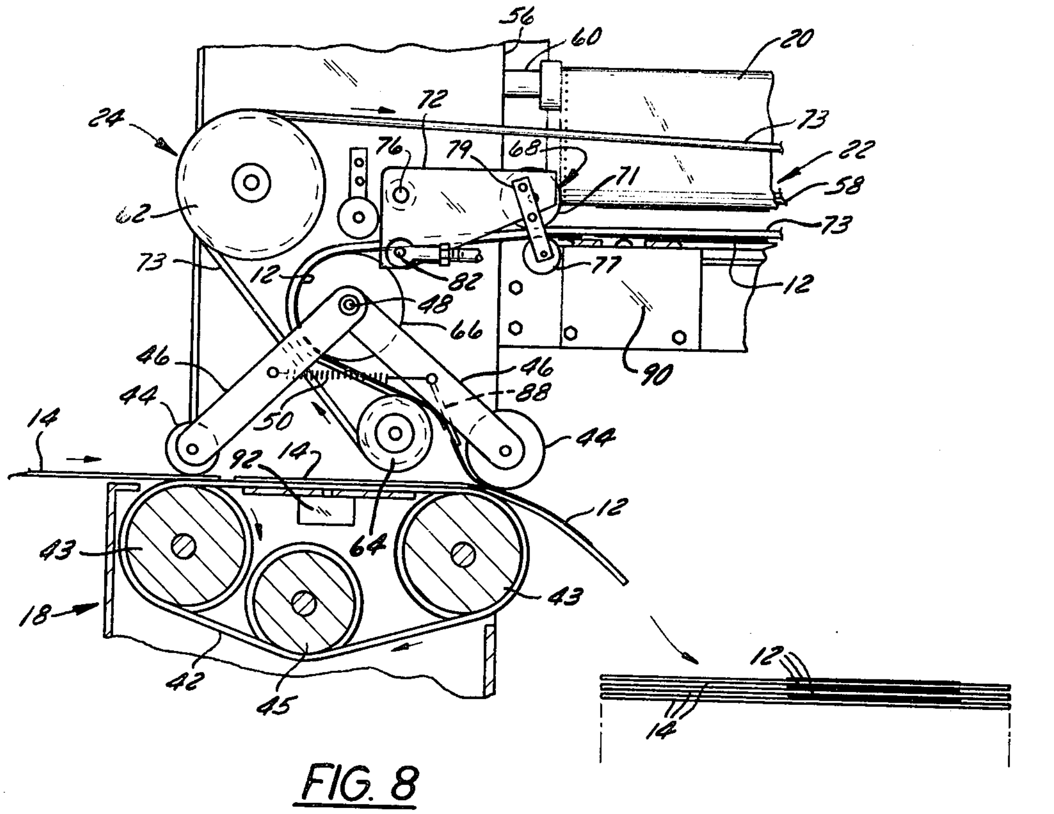
FIG. 8 is a view of a portion of the label conveyor assembly showing a label being applied to a parcel on the parcel conveyor assembly.

In the illustrated embodiment of the invention, four rows of labels are shown on the backing sheet 20. It should be noted however that the present invention can be used to remove labels from a backing sheet having one or more rows of labels adhered to the backing sheet. When the conveyor bands 73 are moved to the down position as seen in FIGS. 4 and 8, the labels which have been partially exposed at the stripping assembly will be secured to the conveyor bands 73. The bands 73 are moved in a step-by-step manner in synchronization with the parcels 14 as described hereinafter so that one label will be applied to each parcel 14.

In this regard and referring to FIG. 8, the labels are carried by the bands 73 around the label wheel 66 to reverse the adhesive side of the label from the top to the bottom. As the bands 73 move around the stripping wheel 64, the labels will be partially stripped from the bands 73 due to the inherent stiffness of the label and extend outward from the stripping wheel 64. The label is turned or forced under the idler roller 44 to engage the parcel by means of a guide plate 88 secured to the rocker arm 46.

In the normal sequence of operation, the conveyor bands 73 will stop in the position shown in FIG. 7 with a label located in a position to be applied to a parcel. The time of application of the label to the mailing piece can be controlled by means of a sensor 92 such as a photoelectric cell or micro switch that senses the lead edge of the parcel as the parcel moves onto the mail conveyor assembly 18. Since the distance between the lead edge of the parcel and the lead edge of the label is known, and the time required to move the parcel this distance is also known, the bands 73 will be activated as the parcel moves under the label 12. The bands 73 will be advanced far enough to move the length of one label. The label will be forced under the idler roll 44 so that the adhesive surface of the label is forced against the parcel as seen in FIG. 8. The label will be stripped from the bands 73 as the conveyor moves around the idler roll 64 and the conveyor will stop with the next label in the position shown in FIG. 7.

The initiation of the cycle of motion of the rocker plates 72 and 74 is controlled by means of a sensor 90 mounted on plate 86. The sensor 90 responds to the absence of a label on the conveyor assembly. As the last label 14 on the conveyor band 73 passes the sensor 90, the sensor actuates a single revolution clutch and rocker plates 72 and 74 pivot up past the row of new labels and then reverse direction to remove the new row of labels to start the new sequence of labels moving on plate 86. By locating the sensor 90 under plate 86, the number of labels on the conveyor band 73 will not affect the operation since the sensor 90 only initiates a cycle of operation when there is no label above the sensor. The cycle of motion of the rocker assembly 72 and 74 must be faster than the time it takes to move a piece of mail across the mail conveyor. The cycle of motion is therefore a continuous motion and is, for all practical purposes, instantaneous.

The drive motor for the label dispensing and applicating machine is located within the housing 56. The mail conveyor 18 is driven continuously. The conveyor bands 73 are driven by a one revolution clutch which is activated by the sensor 92 to rotate either one of the rollers 62 and wheel 64 far enough to feed one label on to the piece of mail.

The plates 72 and 74 can be actuated by a solenoid connected to rod 80 which is responsive to a sensor 90 that initiates a cycle of motion of the conveyor bands 73 after the last label on the bands 73 passes sensor 90. It is possible to use a photoelectric cell in place of the micro switches 90 and 92 to sense the position of the labels to cycle the rocker plates 72 and 74. The backing sheet is cycled through one step of motion at the end of each cycle of motion of the plates 72 and 74.

The embodiments of the invention in which an exclusive property or privilege is claimed, are defined as follows:

1. An apparatus for simultaneously removing a plurality of pressure-sensitive labels from a backing sheet and applying the labels to parcels moving in sequence on a conveyor, said apparatus comprising a label stripping assembly for stripping a substantial portion of the labels from the backing sheet to expose the pressure-sensitive adhesive surface of the labels, conveyor means for transporting parcels in sequence from a loading station to a dispensing station, an elastic belt conveyor for transferring labels in sequence from said stripping assembly to said parcels, means operatively connected to move a portion of said belt conveyor through a cycle of motion which intersects the non-adhesive surface of the label on the initial movement of the conveyor and the pressure-sensitive adhesive surface on the return motion of the conveyor whereby said labels will adhere to the belt conveyor on the return motion.

2. The apparatus according to claim 1 wherein said belt conveyor includes at least one elastic band.

3. The apparatus according to claim 1 or 2 wherein said belt conveyor is positioned to move in a direction transverse to the direction of motion of the backing sheet.

4. The apparatus according to claim 1 wherein said means for moving a portion of said belt conveyor through a cycle of motion includes a rocker roller assembly located at each edge of the backing sheet, said rocker roller assembly supporting a portion of the belt conveyor for movement through said labels.

5. The apparatus according to claim 4 wherein said belt conveyor includes an idler roller for stripping labels from said belt conveyor as the belt conveyor moves around the idler roller.

6. The apparatus according to claim 1, 2 or 5 including means for advancing said belt conveyor in a step-by-step manner in timed relation to the movement of a parcel on said conveyor means whereby labels on said belt conveyor will be advanced in timed sequence to the movement of parcels on the conveyor means.

7. The apparatus according to claim 1 including means for guiding the exposed adhesive surface of said label into engagement with said parcels on said conveyor.

8. The apparatus according to claim 7, wherein said means for moving a portion of said belt conveyor to pick up labels from said backing sheet includes a connecting rod connected to each of said rocker roller assemblies whereby, said rocker roller assemblies move through identical cycles of motion to transfer the portion of the belt conveyor between the assemblies from a position on the non-adhesive side of the label to a position on the pressure-sensitive side of the label and back into engagement with the pressure side of the label, whereby the belt conveyor will engage the pressure-sensitive side of the labels on the return motion of the belt conveyor.

9. The apparatus according to claims 1, 2 or 7, including means sensitive to the presence of a parcel on the conveyor for initiating a step of motion of said belt conveyor.

10. The apparatus according to claim 9, including means responsive to the absence of a label on the belt for initiating the operation of the stripping assembly to cycle a portion of the conveyor past the backing sheet to pick up the next row of labels.

11. An apparatus for stripping pressure sensitive labels from a backing sheet and applying the labels to letters in timed sequence to the movement of the letters on a conveyor, said apparatus comprising the combination of a label stripping assembly of the type that moves a backing sheet in a step by step motion around a sharp edge to strip a portion of a label from the backing sheet and expose the pressure-sensitive adhesive surface of the labels, a conveyor for transporting letters in sequence from a loading station to a dispensing station, and a conveyor assembly for stripping said labels from said backing sheet and transferring said labels in sequence to said letters, said assembly including one or more elastic bands, and means for moving a portion of the elastic bands through a cycle of motion which intersects the non-adhesive surface of the label on the initial movement of the band and the pressure sensitive adhesive surface on the return motion of the band to strip the label from the backing sheets.

12. The apparatus according to claim 11, wherein said elastic bands are mounted in a position to move in a direction transverse to the direction of movement of the backing sheet and parallel to the direction of movement of the letters.

13. The apparatus according to claim 12, wherein said belt conveyor assembly includes a stripping wheel, said elastic band being mounted to pass around the stripping wheel whereby labels carried on said band will be stripped from the band due to the inherent stiffness of the label.

14. The apparatus according to claim 13, wherein said belt conveyor assembly includes means for guiding labels stripped from said elastic band into engagement with said letters.

15. The apparatus according to claim 14, including means for advancing the band around the stripping wheel a distance sufficient to strip a label from the band in timed sequence to the movement of the letters on the conveyor.

16. The apparatus according to claim 12 including means for sensing the presence of a label on the elastic band and to initiate a cycle of motion in said moving means in the absence of a label on the band to strip a label from the backing strip.

* * * * *